United States Patent
Chin et al.

(10) Patent No.: US 8,594,054 B2
(45) Date of Patent: Nov. 26, 2013

(54) TECHNIQUE FOR SCHEDULING TD-SCDMA IDLE INTERVALS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, AZ (US)

( * ) Notice: Subject to any disclaimer, the term of this patent is extended or adjusted under 35 U.S.C. 154(b) by 211 days.

(21) Appl. No.: 13/172,558

(22) Filed: Jun. 29, 2011

(65) Prior Publication Data

US 2012/0020332 A1  Jan. 26, 2012

Related U.S. Application Data

(60) Provisional application No. 61/366,475, filed on Jul. 21, 2010.

(51) Int. Cl.
*H04B 7/216* (2006.01)

(52) U.S. Cl.
USPC .......................... 370/335; 370/342

(58) Field of Classification Search
None
See application file for complete search history.

(56) References Cited

U.S. PATENT DOCUMENTS

| | | | |
|---|---|---|---|
| 7,200,124 B2 * | 4/2007 | Kim et al. | 370/324 |
| 7,313,116 B2 * | 12/2007 | Lee et al. | 370/335 |
| 7,796,556 B2 * | 9/2010 | Andersson et al. | 370/332 |
| 7,936,731 B2 * | 5/2011 | Park et al. | 370/336 |
| 8,102,817 B2 * | 1/2012 | Nickisch | 370/331 |
| 8,165,175 B2 * | 4/2012 | Wang et al. | 370/528 |
| 8,224,329 B2 * | 7/2012 | Van Lieshout et al. | 455/436 |
| 2006/0039329 A1 * | 2/2006 | Samuel et al. | 370/335 |
| 2008/0101311 A1 * | 5/2008 | Bernhard et al. | 370/342 |
| 2008/0318577 A1 | 12/2008 | Somasundaram et al. | |
| 2009/0135787 A1 * | 5/2009 | Uemura et al. | 370/335 |
| 2011/0280140 A1 * | 11/2011 | Chin et al. | 370/252 |

FOREIGN PATENT DOCUMENTS

EP  1871133 A1  12/2007

OTHER PUBLICATIONS

International Search Report and Written Opinion—PCT/US2011/044904, International Search Authority—European Patent Office—Oct. 14, 2011.

* cited by examiner

*Primary Examiner* — Clemence Han
(74) *Attorney, Agent, or Firm* — Kristine U. Ekwueme

(57) ABSTRACT

Certain aspects of the present disclosure relate to a technique for scheduling TD-SCDMA idle intervals, wherein a frame for inter-RAT measurement is selected based on a number of UEs allocated.

32 Claims, 7 Drawing Sheets

TECHNIQUE FOR SCHEDULING TD-SCDMA IDLE INTERVALS

CLAIM OF PRIORITY UNDER 35 U.S.C. §119

The present Application for Patent claims priority to U.S. Provisional Application Ser. No. 61/366,475, entitled, "Technique for Scheduling TD-SCDMA Idle Intervals," filed Jul. 21, 2010, and assigned to the assignee hereof and hereby expressly incorporated by reference herein.

BACKGROUND

1. Field

Certain aspects of the present disclosure relate generally to wireless communication systems, and more particularly, to techniques for scheduling TD-SCDMA idle intervals.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Certain aspects of the present disclosure provide a method for wireless communications. The method generally includes selecting a frame in a first interval period to be allocated to a UE for performing inter-RAT measurements in the selected frame, wherein the frame is selected based on a number of UEs allocated to the frame for inter-RAT measurements in the first interval period and transmitting an indication of the selected frame to the UE to enable the UE to perform the inter-RAT measurements in the selected frame.

Certain aspects of the present disclosure provide an apparatus for wireless communications. The apparatus generally includes means for selecting a frame in a first interval period to be allocated to a UE for performing inter-RAT measurements in the selected frame, wherein the frame is selected based on a number of UEs allocated to the frame for inter-RAT measurements in the first interval period and means for transmitting an indication of the selected frame to the UE to enable the UE to perform the inter-RAT measurements in the selected frame.

Certain aspects of the present disclosure provide an apparatus for wireless communications. The apparatus generally includes at least one processor and a memory coupled to the at least one processor. The at least one processor is configured to select a frame in a first interval period to be allocated to a UE for performing inter-RAT measurements in the selected frame, wherein the frame is selected based on a number of UEs allocated to the frame for inter-RAT measurements in the first interval period and transmit an indication of the selected frame to the UE to enable the UE to perform the inter-RAT measurements in the selected frame.

Certain aspects of the present disclosure provide a computer-program product for wireless communications, the computer-program product generally including a computer-readable medium comprising code. The code generally includes code for selecting a frame in a first interval period to be allocated to a UE for performing inter-RAT measurements in the selected frame, wherein the frame is selected based on a number of UEs allocated to the frame for inter-RAT measurements in the first interval period and transmitting an indication of the selected frame to the UE to enable the UE to perform the inter-RAT measurements in the selected frame.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
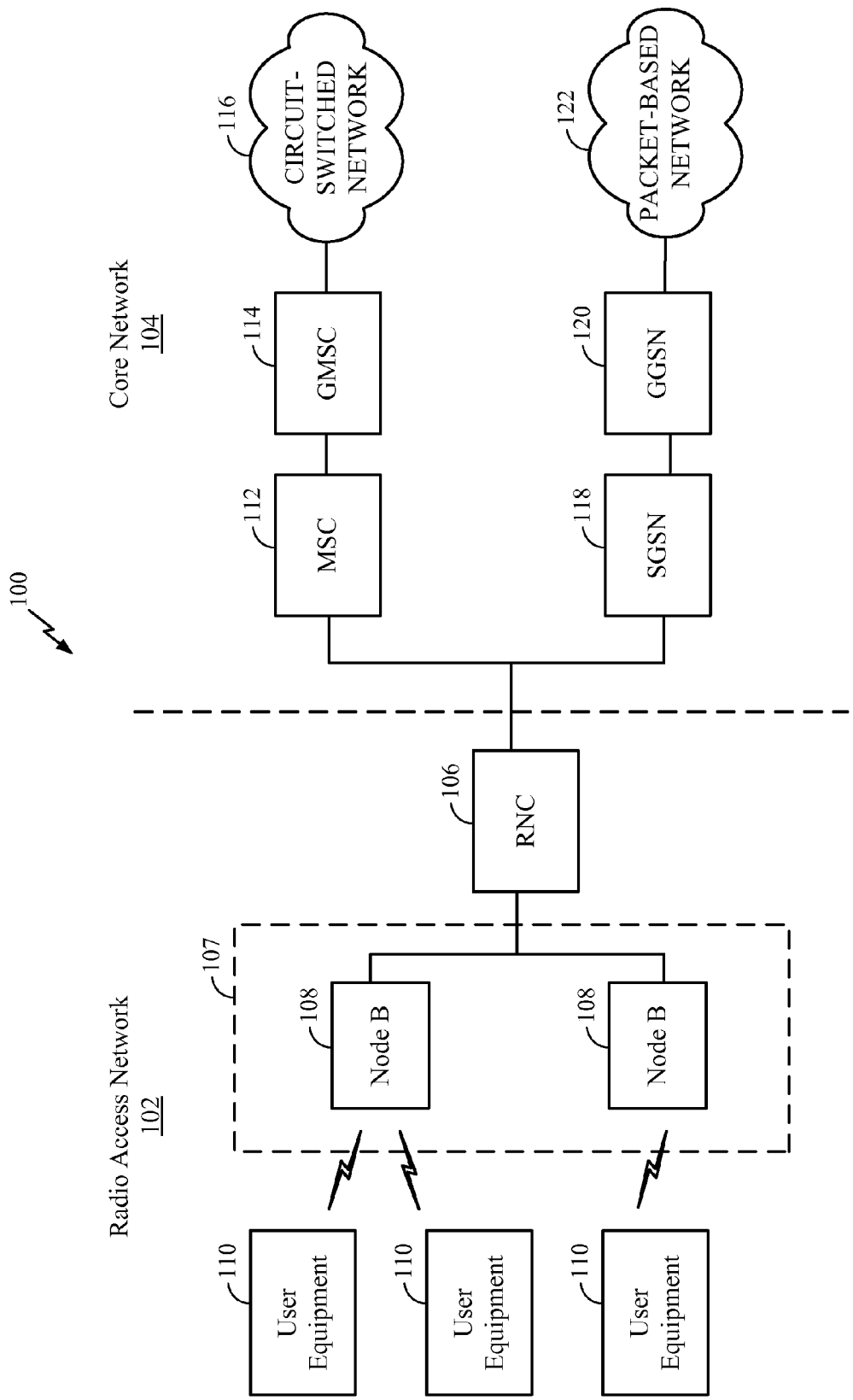
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
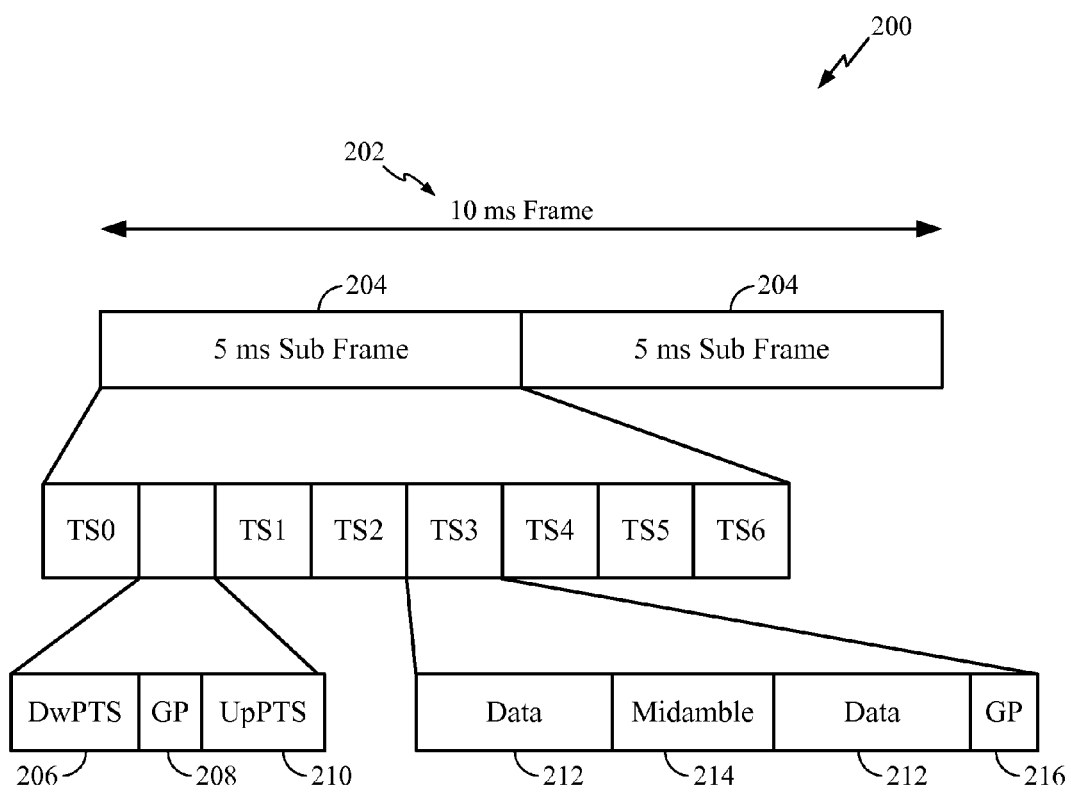
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
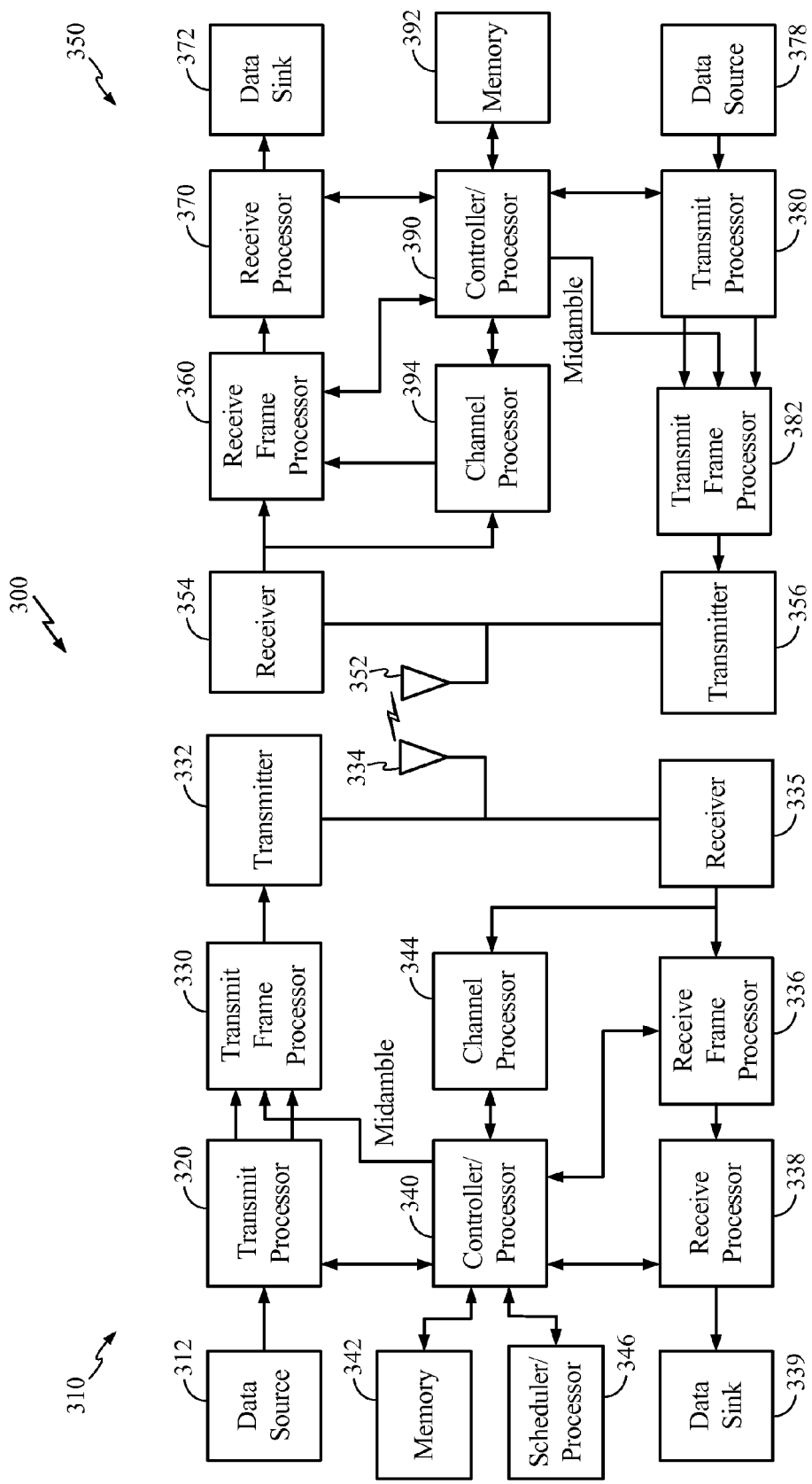
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Example Technique for Scheduling TD-SCDMA Idle Intervals

In 3GPP ($3^{rd}$ Generation Partnership Project) Release 8, the standards define a method to perform inter-RAT (Radio Access Technology) measurement based on the idle interval. The NB (Node B) may include an idle interval IE (Information Element) in the Measurement Control message to enable a UE to perform the inter-RAT measurement in the System Frame Number (SFN) as follows:

$$\text{SFN mod } (2^m) = \text{Offset}$$

The parameter generally refers to an index of the interval period and where m=2, 3. The interval period, therefore, may be 4 or 8 radio frames, for example. The parameter "Offset" generally represents an offset in the interval period, where the offset may range, for example, from 0-7.

Figure 4:
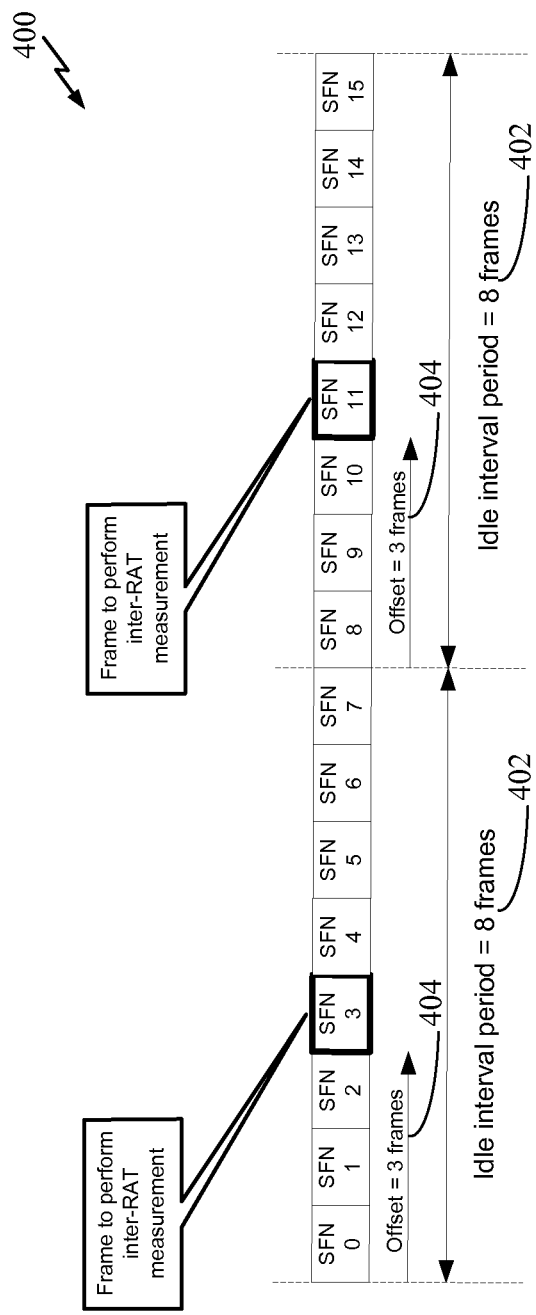
FIG. 4 is a functional block diagram conceptually illustrating inter-RAT (Radio Access Technology) measurements in the SFN (System Frame number) during an idle interval period according to definitions in 3GPP ($3^{rd}$ Generation Partnership Project).

FIG. 4 is a functional block diagram conceptually illustrating inter-RAT (Radio Access Technology) measurements in the SFN (System Frame number) during an idle interval period according to definitions in 3GPP (3$^{rd}$ Generation Partnership Project). As illustrated, each idle interval period 402 includes eight frames, for example SFN0 to SFN7 and SFN8 to SFN15. In this example, an offset 404 of 3 frames indicates that a fourth frame in each idle interval period 402 (SFN 3 and SFN 11) will be used for performing inter-RAT measurements.

However, in some cases, a plurality of UEs may be allocated with idle intervals to perform inter-RAT measurements at a particular time instance in a cell. If a relatively large percentage of UEs are allocated in an SFN for idle interval, then the system capacity of the cell may be underutilized in the radio frame allocated for idle interval.

Certain aspects of the present disclosure, however, provide a scheduling algorithm that may help balance the idle interval of TD-SCDMA system by considering the number of UEs allocated to particular frames for Inter-RAT measurements.

Figure 5:
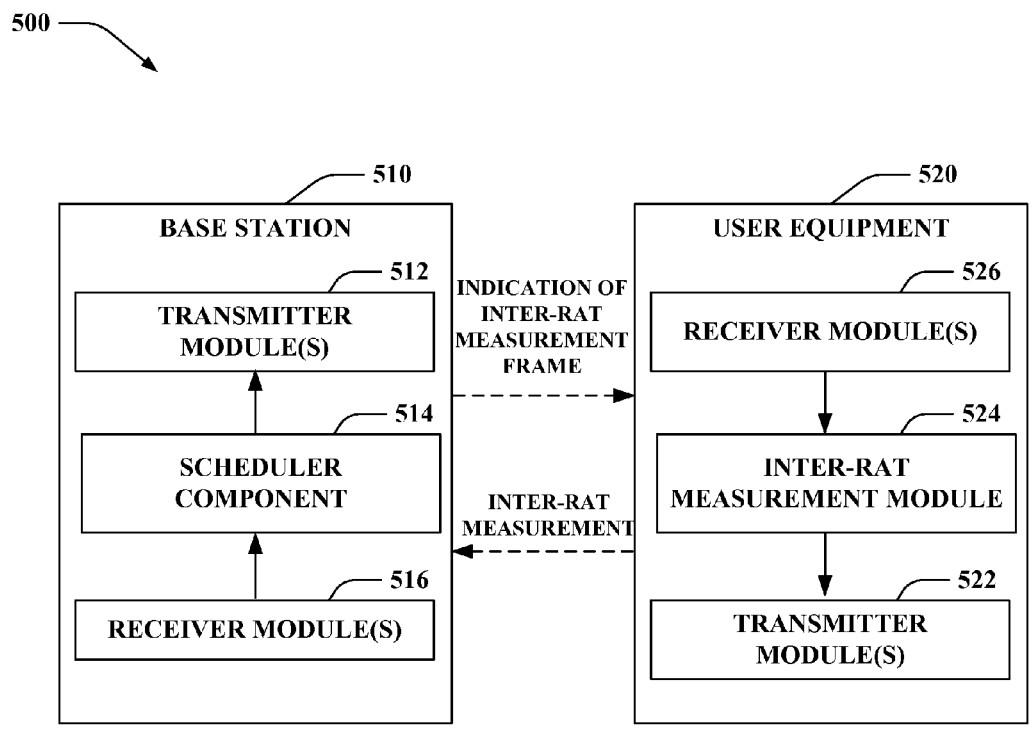
FIG. 5 illustrates example components of a base station and user equipment in accordance with certain aspects of the present disclosure

FIG. 5 illustrates example components of a base station and user equipment in accordance with certain aspects of the present disclosure.

FIG. 5 illustrates an example BS 510 that may have a schedule component 514 configured to select a frame in a first interval period to be allocated to a UE for performing inter-RAT measurements in the selected frame. To help balance idle intervals among UEs, the frame may be selected based on a number of UEs allocated to the frame for inter-RAT measurements in the first interval period. The BS 510 may transmit, via a transmitter module 512, an indication of the selected frame to the UE to enable the UE to perform the inter-RAT measurements in the selected frame.

As illustrated, the UE 520 may include one or more receiver modules 526 and one or more transmitter modules 522, allowing the UE to communicate with multiple RATs. The UE may include an Inter-RAT measurement module 524 configured to perform Inter-RAT measurements in the frame indicated by the BS 510. The UE may transmit Inter-RAT measurement results to the BS 510. The BS 510 may receive the Inter-RAT measurement results and the scheduler component 514 may utilize information contained therein, for example, to make handover decisions.

Figure 6:
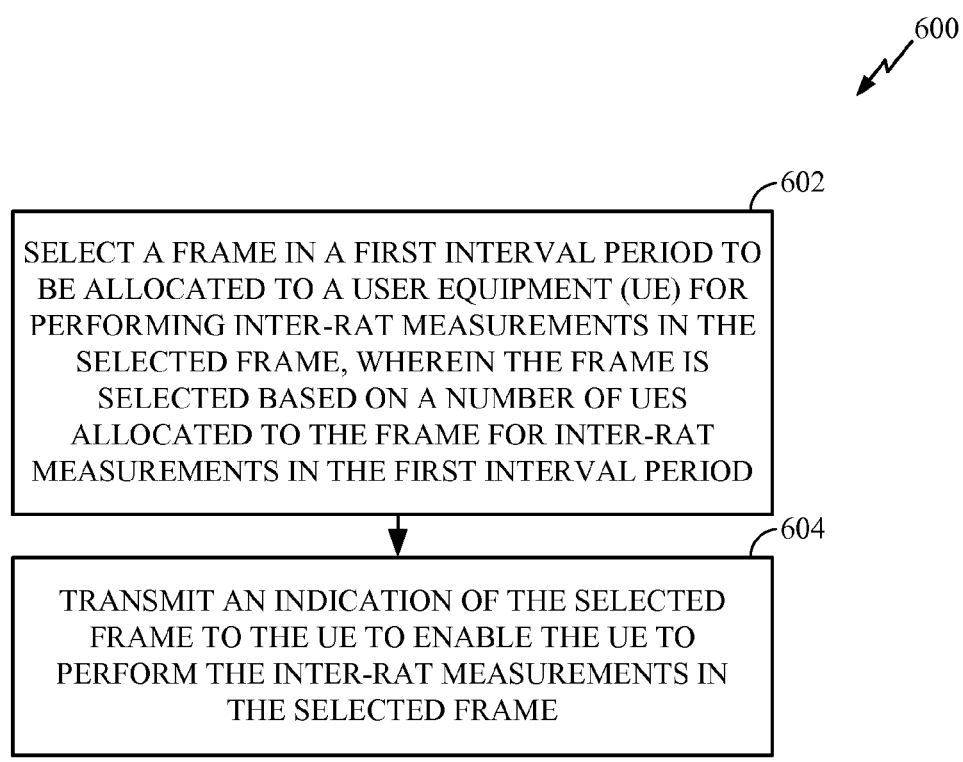
FIG. 6 illustrates example operations that may be performed by a bas station in accordance with certain aspects of the present disclosure

FIG. 6 illustrates example operations 600 that may be performed by a base station (e.g., a NodeB or NB), such as BS 510 of FIG. 5, in accordance with certain aspects of the present disclosure.

The operations 600 begin, at 602, by selecting a frame in a first interval period to be allocated to a UE for performing inter-RAT measurements in the selected frame, wherein the frame is selected based on a number of UEs allocated to the frame for inter-RAT measurements in the first interval period. At 604, an indication of the selected frame is transmitted to the UE to enable the UE to perform the inter-RAT measurements in the selected frame.

State Variable

According to certain aspects, a Node B (NB) may keep track of the number of UEs being allocated for 8 SFNs in a particular cell, in order to determine which frame to select for a particular UE to perform inter-RAT measurements.

For example, a state variable N(i) may represent the number of UEs currently being allocated with an idle interval and an Offset=i. For example, the state variable may assume an idle interval period of 8 (such that 0≤i≤7). The state variable N(i) may be maintained as follows. If a UE is allocated with an idle interval period=4 and an offset=j, where j=0-3, then both N(j) and N(j+4) may be incremented by one, because this UE uses an idle interval in both SFN=j and SFN=j+4 over the 8-frame time interval.

If a UE utilizes an idle interval period of 8, then the NB may allocate an offset k corresponding to a minimum among N(i). This may be represented by the following equation:

$$N(k) = \text{Min}\{N(i)\}, 0 \leq i \leq 7 \qquad (1)$$

If a UE utilizes an idle interval period=4, then N'(u) may be derived, based on the UE utilizing two subframes in the 8 subframe interval period, as follows:

$$N'(u) = N(u) + N(u+4), u=0, 1, 2, 3 \qquad (2)$$

The NB may then allocate an offset=k with minimum among N'(u), which may be represented as:

$$N'(k) = \text{Min}\{N'(u)\}, 0 \leq u \leq 3 \qquad (3)$$

Figure 7:
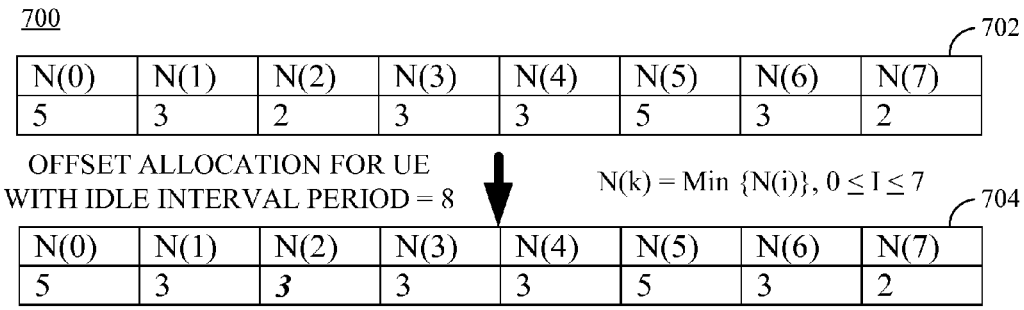
FIG. 7 is a functional block diagram conceptually illustrating example offset allocation for a UE with idle interval period of eight in accordance with certain aspects of the present disclosure.

FIG. 7 is a functional block diagram conceptually illustrating example offset allocation 700 for a UE with idle interval period of eight in accordance with certain aspects of the present disclosure. State variable N(i) 702 represents a current number of UEs with respective idle intervals and offsets i=0-7, allocated for 8 SFNs in a particular cell. For example, 5 UEs are allocated to N(0).

If a next UE needs an idle interval period of 8, the NB may allocate the UE an offset k of a minimum N(i), according to Equation 1 noted above. Thus, in this example, the UE may be allocated with offset k=2 or 7, as N(2) and N(7) represent minimum N(i), with 2 UEs allocated in each. Assuming offset k=2 is allocated, N(2) is incremented by one. State variable N(k) 704 shows the updated value of state variable 702 with incremented N(2), resulting in a value of 3-as shown with italics in the figure.

Figure 8:
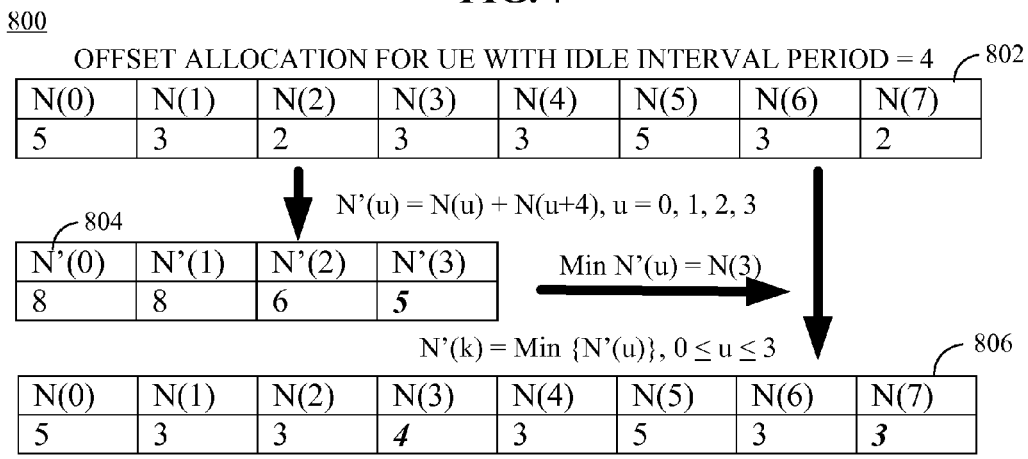
FIG. 8 is a functional block diagram conceptually illustrating example offset allocation for a UE with idle interval period of four in accordance with certain aspects of the present disclosure.

FIG. 8 is a functional block diagram conceptually illustrating example offset allocation 800 for a UE with idle interval period of four in accordance with certain aspects of the present disclosure. State variable 802 represents a current number of UEs with respective idle intervals and offsets i=0-7, allocated for 8 SFNs in a particular cell.

If a next UE needs an idle interval period=4, state variable N'(u) 804 with u=0-3 may derived from state variable 802 in accordance with Equation 2, noted above. For example, this results in N'(0)=N(0)+N(4), with N(0)=5 and N(4)=3, or N'(0)=8. The NB may allocate the UE an offset k of a minimum N'(u) according to Equation 3 above. Thus, in this example, the UE may be allocated with offset k=3 as N'(3) represent minimum N'(u). State variable N'(k) 806 shows the updated state variable 802. As discussed above, when idle period=4 with offset=j, both N(j) and N(j+4) are incremented. Thus, state variable N'(k) shows both N(3) and N(7) are incremented, to values of 4 and 3, respectively.

Figure 9:
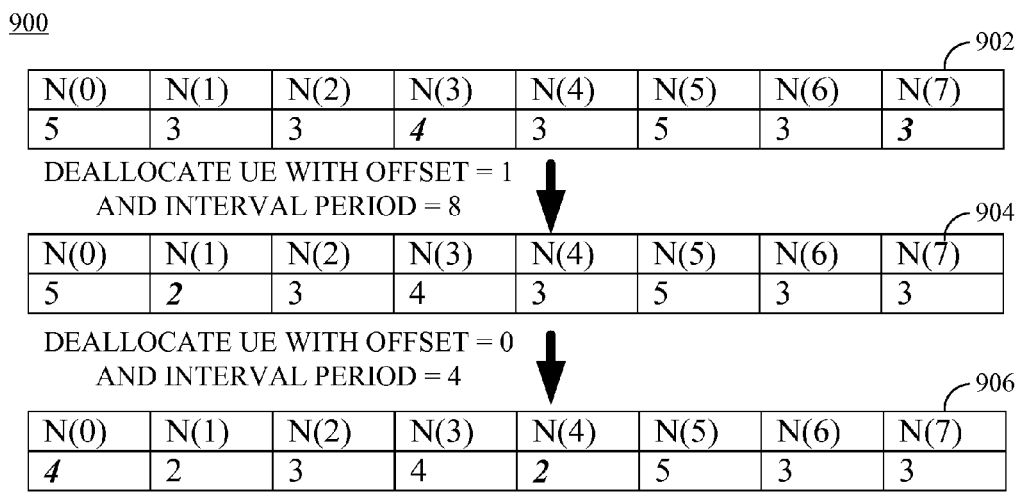
FIG. 9 is a functional block diagram conceptually illustrating example frame de-allocation in accordance with certain aspects of the present disclosure.

FIG. 9 is a functional block diagram conceptually illustrating example frame de-allocation 900 in accordance with certain aspects of the present disclosure. State variable 902 represents a current number of UEs with respective idle intervals and offsets i=0-7, allocated for 8 SFNs in a particular cell.

According to certain aspects, whenever a UE completes inter-RAT measurement, the state variable 902 may be decremented. For example if a UE with offset=1 and idle interval period=8 is de-allocated, then the state variable 902 may be updated to state variable 904 by decrementing N(1), in this example, from 5 to 4. Thus, state variable 904 now represents the current state of UE allocations.

For example, if another UE with offset=0 and idle interval period=4 is de-allocated, then the state variable 904 is updated to state variable 906 by decrementing N(0) and N(4), in this example, from 5 to 4 and from 3 to 2, respectively.

According to certain aspects, the proposed technique for scheduling TD-SCDMA idle intervals allows balancing the idle interval across the radio frames and improves capacity. In an aspect, the spare capacity allocated for idle interval may be allocated for other UEs.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of a list of" items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   selecting a frame in a first interval period to be allocated to a UE for performing inter-RAT measurements in the selected frame, wherein the frame is selected based on a number of UEs allocated to the frame for inter-RAT measurements in the first interval period; and
   transmitting an indication of the selected frame to the UE to enable the UE to perform the inter-RAT measurements in the selected frame.

2. The method of claim 1, wherein selecting the frame comprises:
   selecting an offset of the frame, wherein the indication comprises the selected offset.

3. The method of claim 1, wherein selecting the frame comprises:
   selecting the frame having a minimum number UEs allocated to the frame for inter-RAT measurements in the first interval period.

4. The method of claim 1 further comprising:
   incrementing the number of UEs allocated to the frame for inter-RAT measurements.

5. The method of claim 1, wherein selecting the frame comprises:

selecting the frame based on a second interval period of the UE.

6. The method of claim 5, wherein the second interval period is same as the first interval period.

7. The method of claim 5, wherein the second interval period is less than the first interval period.

8. The method of claim 1, further comprising:
de-allocating the frame from the UE after the UE has completed the inter-RAT measurements; and
decrementing the number of UEs allocated to the frame for inter-RAT measurements in the first interval period.

9. An apparatus for wireless communication, comprising:
means for selecting a frame in a first interval period to be allocated to a UE for performing inter-RAT measurements in the selected frame, wherein the frame is selected based on a number of UEs allocated to the frame for inter-RAT measurements in the first interval period; and
means for transmitting an indication of the selected frame to the UE to enable the UE to perform the inter-RAT measurements in the selected frame.

10. The apparatus of claim 9, wherein the means for selecting the frame comprises:
means for selecting an offset of the frame, wherein the indication comprises the selected offset.

11. The apparatus of claim 9, wherein the means for selecting the frame comprises:
means for selecting the frame having a minimum number UEs allocated to the frame for inter-RAT measurements in the first interval period.

12. The apparatus of claim 9 further comprising:
means for incrementing the number of UEs allocated to the frame for inter-RAT measurements.

13. The apparatus of claim 9, wherein the means for selecting the frame comprises:
means for selecting the frame based on a second interval period of the UE.

14. The apparatus of claim 13, wherein the second interval period is same as the first interval period.

15. The apparatus of claim 13, wherein the second interval period is less than the first interval period.

16. The apparatus of claim 9, further comprising:
means for de-allocating the frame from the UE after the UE has completed the inter-RAT measurements; and
means for decrementing the number of UEs allocated to the frame for inter-RAT measurements in the first interval period.

17. An apparatus of wireless communication, comprising:
at least one processor configured to:
select a frame in a first interval period to be allocated to a UE for performing inter-RAT measurements in the selected frame, wherein the frame is selected based on a number of UEs allocated to the frame for inter-RAT measurements in the first interval period; and
transmit an indication of the selected frame to the UE to enable the UE to perform the inter-RAT measurements in the selected frame; and
a memory coupled to the at least one processor.

18. The apparatus of claim 17, wherein selecting the frame comprises:
selecting an offset of the frame, wherein the indication comprises the selected offset.

19. The apparatus of claim 17, wherein selecting the frame comprises:
selecting the frame having a minimum number UEs allocated to the frame for inter-RAT measurements in the first interval period.

20. The apparatus of claim 17, wherein the processor is further configured to:
increment the number of UEs allocated to the frame for inter-RAT measurements.

21. The apparatus of claim 17, wherein selecting the frame comprises:
selecting the frame based on a second interval period of the UE.

22. The apparatus of claim 21, wherein the second interval period is same as the first interval period.

23. The apparatus of claim 21, wherein the second interval period is less than the first interval period.

24. The apparatus of claim 17, wherein the processor is further configured to:
de-allocate the frame from the UE after the UE has completed the inter-RAT measurements; and
decrement the number of UEs allocated to the frame for inter-RAT measurements in the first interval period.

25. A computer-program product for wireless communication, the computer-program product comprising:
a non-transitory computer-readable medium comprising code for:
selecting a frame in a first interval period to be allocated to a UE for performing inter-RAT measurements in the selected frame, wherein the frame is selected based on a number of UEs allocated to the frame for inter-RAT measurements in the first interval period; and
transmitting an indication of the selected frame to the UE to enable the UE to perform the inter-RAT measurements in the selected frame.

26. The computer-program product of claim 25, wherein selecting the frame comprises:
selecting an offset of the frame, wherein the indication comprises the selected offset.

27. The computer-program product of claim 25, wherein selecting the frame comprises:
selecting the frame having a minimum number UEs allocated to the frame for inter-RAT measurements in the first interval period.

28. The computer-program product of claim 25, wherein the non-transitory computer-readable medium further comprises code for:
incrementing the number of UEs allocated to the frame for inter-RAT measurements.

29. The computer-program product of claim 25, wherein selecting the frame comprises:
selecting the frame based on a second interval period of the UE.

30. The computer-program product of claim 29, wherein the second interval period is same as the first interval period.

31. The computer-program product of claim 29, wherein the second interval period is less than the first interval period.

32. The computer-program product of claim 25, wherein the non-transitory computer readable medium further comprises code for:
de-allocating the frame from the UE after the UE has completed the inter-RAT measurements; and
decrementing the number of UEs allocated to the frame for inter-RAT measurements in the first interval period.

* * * * *